United States Patent [19]

Kempkers

[11] 4,213,169
[45] Jul. 15, 1980

[54] COVERED VISOR MIRROR

[75] Inventor: Gordon B. Kempkers, Hamilton, Mich.

[73] Assignee: Prince Corporation, Holland, Mich.

[21] Appl. No.: 958,968

[22] Filed: Nov. 9, 1978

[51] Int. Cl.² .............................................. B60Q 1/00
[52] U.S. Cl. .................................... 362/74; 362/140; 362/141; 362/80
[58] Field of Search ................... 362/74, 135, 80, 140, 362/141, 142, 144

[56] References Cited

U.S. PATENT DOCUMENTS 4,075,468   2/1978   Marcus .............................. 362/144

*Primary Examiner*—Stephen J. Lechert, Jr.
*Attorney, Agent, or Firm*—Price, Heneveld, Huizenga & Cooper

[57] ABSTRACT

An illuminated covered visor mirror for mounting within a vehicle's visor includes a mirror frame having a pair of spaced resilient sockets for receiving hinge pins extending from a cover for hinging the cover to the mirror frame. The sockets and hinge pins include cooperating camming means to provide snap-action closing of the cover holding the cover in the closed position over the mirror when not in use and similarly in an open position for exposing the mirror for use.

23 Claims, 7 Drawing Figures

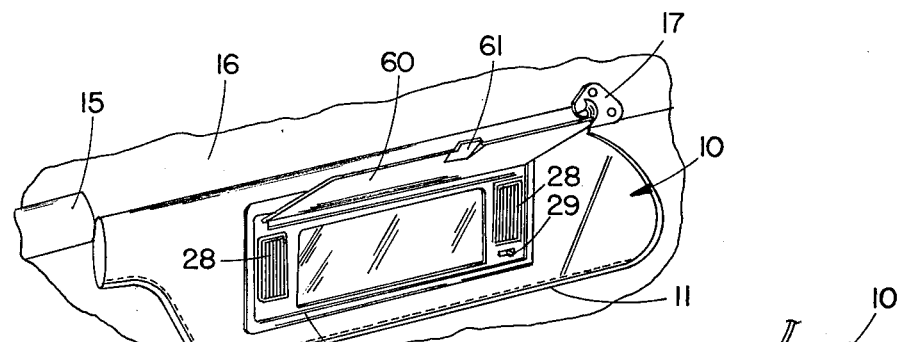
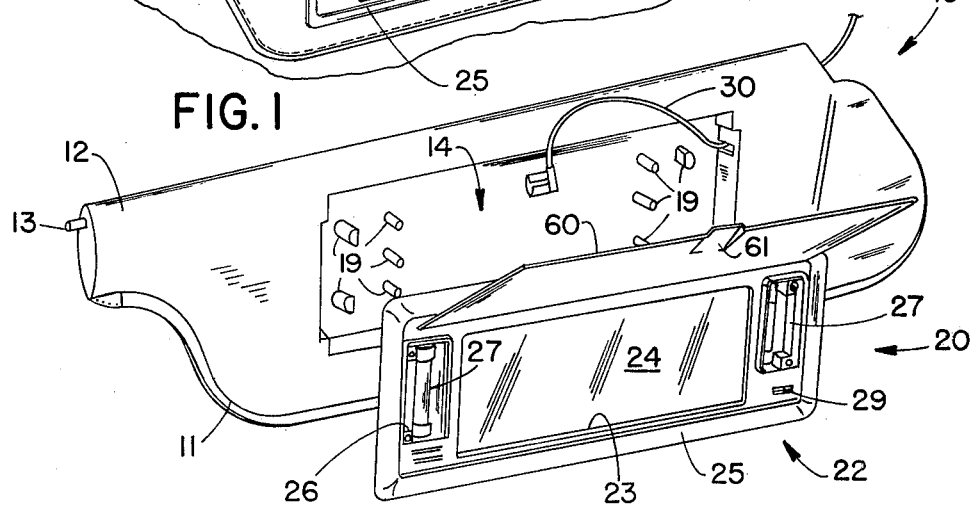
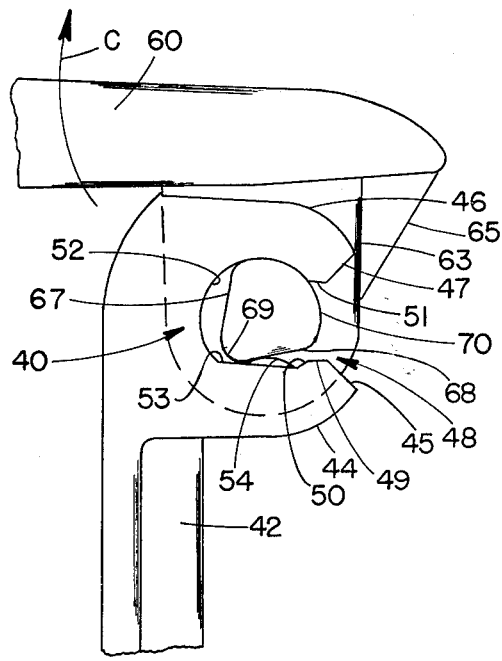
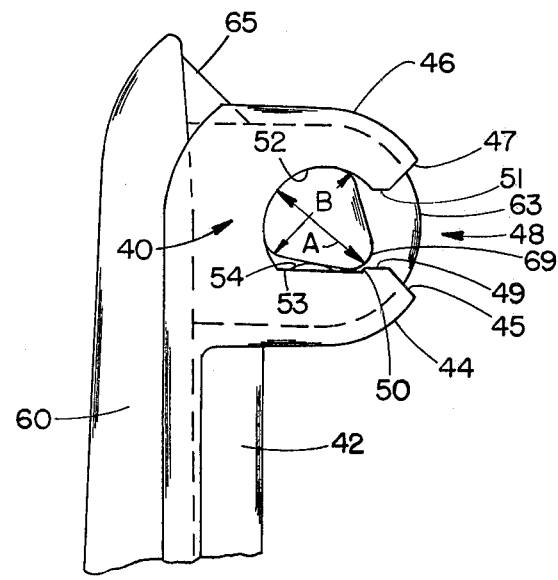

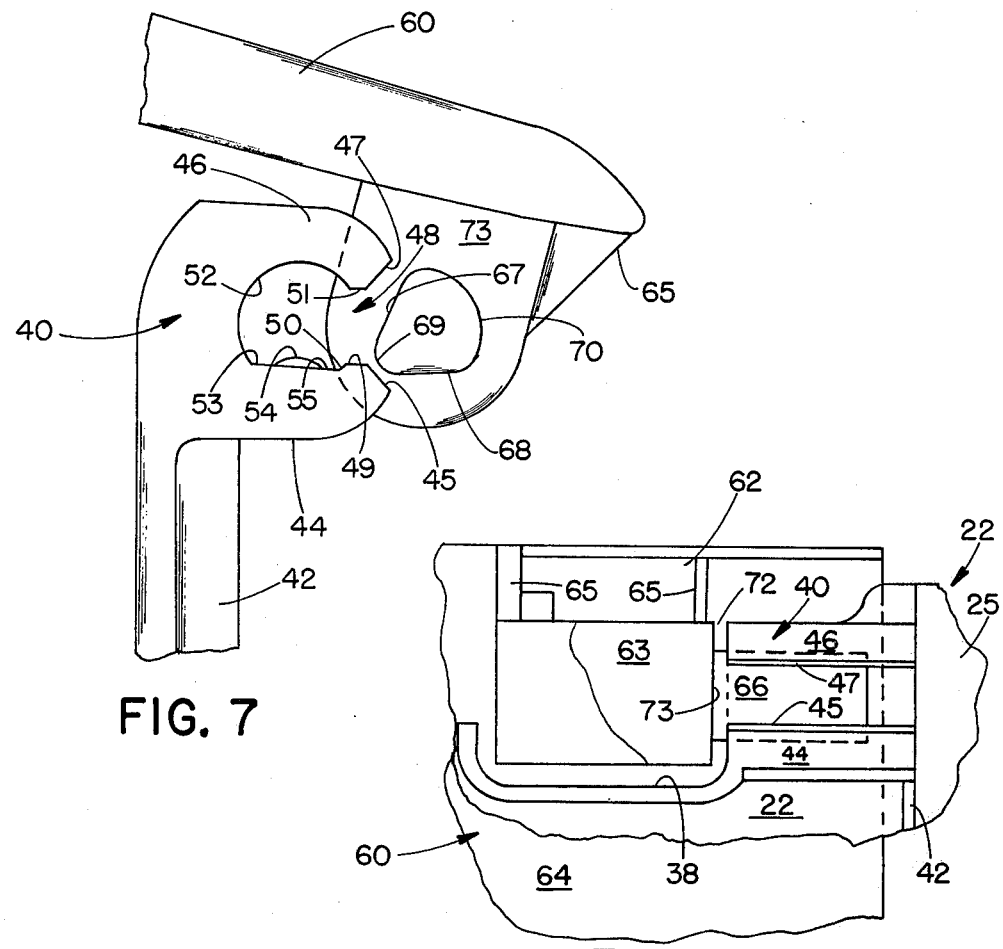
FIG. 7
FIG. 6
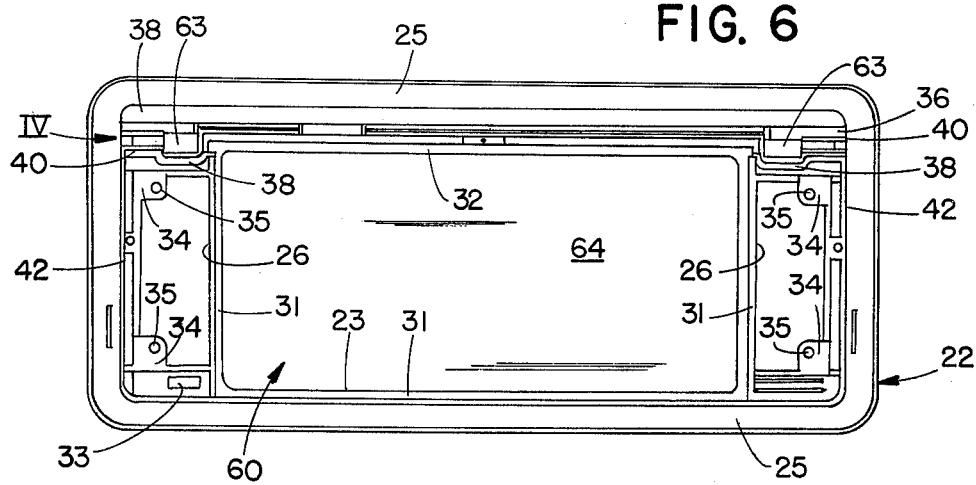
FIG. 3

COVERED VISOR MIRROR

BACKGROUND OF THE INVENTION

The present invention relates to a covered visor mirror and particularly to improved means for mounting the cover to the mirror frame.

Illuminated visor mirrors with a cover are becoming increasingly important and popular as a vehicle accessory. Covers for illuminated mirrors are important for a number of reasons, some of which are to cover the mirror surfaces at the head level of the vehicle passengers or driver which poses a significant hazard in the form of potential glass shattering resulting in serious injury in the event of an accident. Covers are important when the mirror is not in use so as to eliminate stray light reflections which cause a distraction to the vehicle operator. Also, as disclosed in U.S. Pat. Nos. 3,926,470, issued Dec. 16, 1975, to Konrad H. Marcus, and 4,075,468, issued Feb. 21, 1978, to Konrad H. Marcus, both of which are assigned to the present assignee, covers provide a shield when the light is used for reading material such as a map. Covers also provide an advantage from the appearance standpoint.

However, visor mirrors of the type to which the present invention pertain as represented by the above-mentioned patents are rotatably mounted to the mirror frame using hinge pins having crank arms which extend over the center of rotation of the hinge pins. This requires a separate spring coupled from each end of the hinge pin arms to the mirror frame. Such construction, therefore, requires separate crank arms and springs which must be coupled to the hinge pins and the mirror frame. Inasmuch as one of the design considerations is to make the assembly as thin as possible so the visor does not become thick and bulky, severe limitations are placed on the placement of springs. If the assembly and trimming of the package with respect to the visor is not carefully achieved, the springs can rub or catch against upholstery surrounding the frame causing noisy operation of the cover. Also, the spring is subject to fatigue after considerable use.

SUMMARY OF THE PRESENT INVENTION

The present invention significantly simplifies the mounting of the cover to the mirror frame by providing hinge means comprising a pair of hinge pins or pintles extending from opposite ends of the cover and forming the axis of rotation for the cover. The pintles include camming surfaces and are received by integrally molded resilient sockets cooperating with the pintles for moving the cover from a fully closed position smoothly to a fully open position whereby the resilient pintle receiving sockets effect the snap, open, and closed action of the cover and hold it in the open or closed position securely to prevent rattling of the cover in either position.

The frame and cover can be integrally molded of a resilient polymeric material thereby reducing the cost of the unit as compared to the prior art and also providing a highly reliable system having less likelihood of failure. Such construction also permits the cover and frame to assume a minimum thickness desirable in the visor environment. These and other features, objects, and advantages of the present invention can best be understood by referring to the following description thereof together with reference to the drawings, in which:

BRIEF DESCRIPTION OF THE DRAWINGS

FIG. 1 is a front perspective view of a lighted and covered visor mirror of the present invention shown with the cover in an open position;

FIG. 2 is an enlarged fragmentary exploded view of the structure shown in FIG. 1;

FIG. 3 is an enlarged rear elevational view of the mirror frame and cover with the cover shown in a closed position;

FIG. 4 is an enlarged fragmentary end elevational view of the hinge means of the present invention in the cover closed position as viewed from the direction of arrow IV of FIG. 3;

FIG. 5 is an enlarged fragmentary end elevational view of the hinge means of the present invention shown in the cover opening position and viewed in the same direction as FIG. 4;

FIG. 6 is an enlarged fragmentary rear elevational view of the hinge means of the present invention at the right end of the unit shown in FIG. 3; and FIG. 7 is an enlarged fragmentary end elevational view of the hinge means of the present invention illustrating the manner of assembly of the cover to the mirror frame.

DETAILED DESCRIPTION OF THE PREFERRED EMBODIMENT

Referring initially to FIGS. 1 and 2, a visor 10 is disclosed incorporating the present invention and is shown in FIG. 1 mounted on the passenger or right side of a vehicle. The visor comprises a visor body 12 made of a core member injection molded of a suitable polymeric material such as polypropylene and including a central rectangular recess 14 (FIG. 2) for receiving therein a visor mirror frame assembly 20. The core of the visor is covered by a suitable upholstery material or textured to conform to the upholstery of the vehicle interior and is trimmed along the edge by a suitable bead 11. A post 13 extends from one end of the visor and detachably couples to a bracket 15 in the headliner 16 of the vehicle. The opposite end of the visor includes a pivot mounting bracket 17 allowing the visor to be moved down into the position shown in FIG. 1 or upwardly against the headliner 16 in a conventional stowed position. Also bracket 17 permits the visor to swivel to a side window if desired. The visor body 12 is substantially the same and manufactured in the same manner as that disclosed in the above identified U.S. Pat. No. 4,075,468, the disclosure of which is incorporated herein by reference.

The visor mirror assembly 20 comprises a generally rectangular frame 22 having a central rectangular opening 23 into which there is secured a mirror 24. On the front of frame 22 there is provided a peripheral trim flange 25 which surrounds and extends over the edge of recess 14 in the visor body when assembly 20 is mounted as shown in FIG. 1. Posts 19 are provided within recess 14 for receiving screws securing assembly 20 in the visor body.

On opposite sides of the rectangular opening 23 there is provided vertically oriented rectangular openings 26 for receiving therein electrical sockets holding in turn cartridge type 12 VDC lamps 27 positioned on opposite sides of mirror 24. Lamps 27 direct light through lenses 28 (FIG. 1) forwardly of the assembly to illuminate the face of a passenger and focus the light away from the driver's side to permit use of the lighted mirror without interfering with the driver. Lenses 28 are snap-fitted into apertures 26 to permit lamps 27 to be readily replaced.

A switch 29 is provided for selectively applying electrical power to lamps 28 for brightening and dimming the lamps. Integral with the assembly, as disclosed in the above identified patent, is an electrical switch cooperating with the cover 60 hingedly coupled to frame 22 for applying electrical power to the lamps. Thus, when the cover is opened, electrical power is applied to the lamps and when closed, the lamps are extinguished. For this purpose, an electrical conductor 30 is provided and supplies operating power from the vehicle battery to the lighting circuit for the lamps 28. The lamp control electrical circuits and their mounting to the frame 22 are disclosed in greater detail in the above identified U.S. Pat. Nos. 3,926,470 and 4,075,468 the disclosures of which are incorporated herein by reference. Having briefly described the overall visor construction, a detailed description of the frame and the improved hinge means mounting the cover to the frame is now presented with reference to FIGS. 3 through 7.

As best seen in FIG. 3, surrounding the central opening 23 for receiving a mirror 24 in frame 22 is a rectangular ridge 31 into which the mirror extends and which can be staked over the edge of the mirror edges holding it in position with framing portion 32 contacting the forward peripheral edge of the mirror and the staked over ridge 31 compressibly holding the mirror and any backing plate associated with the mirror in place within aperture 23. Below the left aperture 26 for one of the lenses 28 there is provided a rectangular opening 33 permitting the switch 29 (FIGS. 1 and 2) to extend through the frame 22 for access from the front. On the outside edges on the upper and lower corners of each aperture 26 there is integrally formed in frame 22 mounting bosses 34 having apertures 35 extending therethrough permitting a fastening screw to extend into mounting bosses 19 (FIG. 2) of the visor core for securing frame 22 to the visor core.

Along the top edge of frame 22 between the upper framing segment 32 and the upper portion of flange 25 there is provided a slot 36 through which the cover 60 is extended during installation as described in greater detail below. Above slot 36 there is provided a reinforcing ledge 38 extending substantially the width of the frame between the vertically extending side legs of peripheral flange 25. Slot 36 includes a pair of downwardly formed rectangular notches 38 (FIGS. 3 and 6) near opposite ends of frame 22 above apertures 26 providing clearance for a mounting boss 63 near the opposite ends of cover 60. Communicating with notches 38 on the outer edges thereof and integrally formed within the frame member is a pair of sockets 40 which are best seen in FIGS. 4, 5, and 7. Each of the sockets 40 are generally cylindrical and extend longitudinally in alignment with one another on an axis substantially parallel to the longitudinal axis of frame 22. The sockets are integrally formed with and extend inwardly from the sidewalls 42 (FIGS. 3, 4, 5, and 7) which wrap around the apertures 26 and communicates with the rectangular rim 31.

Sockets 40 are substantially identical and include, as best seen in FIGS. 4 through 7, a lower leg 44 and an upper leg 46 with an opening or slot 48 between the ends 45 and 47 of legs 44 and 46, respectively. Slot 48 communicates with the generally cylindrical interior space circumscribed by the arms 44 and 46 which are integrally joined at their ends opposite ends 45 and 47. Lower leg 44 curves upwardly terminating at the end 45 which is inclined upwardly and inwardly toward the center of aperture 48. A longitudinally extending plateau 49 defining an inward lip 50 extends along the inside of lower leg 44 adjacent end 45. Upper leg 46 is curved downwardly and includes an inwardly and downwardly inclined end 47 terminating in a substantially horizontal surface 51 which communicates with an arcuate and cylindrically extending inner surface 52 of each of the sockets. Surface 52 curves for substantially 185 degrees terminating in an inner detent 53 defined by the junction of arcuate section 52 with a convexly curved camming section 54. A forward detent 55 extends between the edge of section 54 and lip 50 extending downwardly from surface 49.

Frame 22 and integral sockets 40 are injection molded of a stiffly resilient material such as a resilient polymeric material including, for example, polycarbonate, such as LEXAN ® or the like which permits arms 44 and 46 to be spread apart and resiliently returned to their original position. ABS plastic also could be used in nonlighted visor mirrors with no lamp heat dissipation problem. As will be described in greater detail below, the biasing pressure provided between arms 44 and 46 together with the unique construction of sockets 40 in cooperation with the cover provide the snap, open, and closed action for cover 60 with respect to frame 22.

The cover 60 includes an integrally formed handle 61 (FIGS. 1 and 2) along its forward edge facilitating the opening of the cover by the user when in a closed position. Along the top edge, as best seen in FIG. 6, there is provided a longitudinally extending reinforcing rib 62. Spaced inwardly from each of the opposite sides of cover 60 there is provided an integrally formed mounting boss 63 extending from the rear surface 64 of the cover outwardly. A pair of spaced reinforcing ribs 65 extend from the mounting boss to rib 62. Extending outwardly in axially aligned relationship parallel to the longitudinal axis of cover 60 is a pair of hinge pins or pintles 66. As best seen in FIGS. 4, 5, and 7, each pintle 66 includes camming surfaces 67 and 68 diverging from a rounded apex 69 at one end outwardly at an angle of approximately 60 degrees to an arcuate cylindrically extending surface 70 to form a rounded pie-shaped cross-sectional outer surface configuration. The radius of curvature of surface 70 corresponds to that of arcuate surface 52 of each of the sockets 40. The bosses 63 and pintles 66 are positioned with respect to the sockets 40 integrally formed on frame 22 such that the pintles 66 extend within the sockets as best seen in FIG. 6 with a slight gap 72 between the inner end wall of socket 40 and the outer surface 73 of the mounting boss 63.

In the preferred embodiment of the invention using a cover of 3¼ inches by 8½ inches, the following dimensions were employed with the LEXAN ® material for the cover and frame including the pintles and sockets. The maximum diameter of pintle 66 represented by arrow A in FIG. 4 was 0.19 inches while the dimension across the intersection of surfaces 67 and 68 with curved surface 70 as represented by arrow B in FIG. 4 was 0.17 inches. The flat surfaces 67 and 68 extend approximately 0.14 inches with the rounded edges including apex 69 having a radius of curvature of approximately 0.038 inches. The radius of curvature of surface 70 was approximately 0.069 inches as was the radius of curvature of arcuate surface 52 in the sockets 40. Convexly curved segment 54 has a radius of curvature of 0.094 inches and extends a width of approximately 0.09 inches. The height of convex curve segment 54 is approximately 0.01 inches. The length of the pintles are each 0.30 inches while the sockets have a length of 0.38 inches. The opening 48 between surfaces 49 and 51 was 0.12 inches.

The cover is initially installed to the frame as best seen in FIG. 7 by inserting the forward edge of a cover 60 through slot 36 (FIG. 3) forwardly until the apex 69 of the pintles contact inclined surface 45. The cover is then force-fitted into the sockets by applying suitable pressure spreading arms 44 and 46 with the inclined surfaces 45 and 47 assisting in the spreading of the arms and the insertion of the pintles. The ends of arms 44 and 46 thus lockably secure the pintles within the sockets.

Once the cover is installed, it operates in a manner best seen with reference to FIGS. 4 and 5 which in FIG. 4 shows the cover in the closed position whereby the apex 69 of the pintle is seated against the lip 50 in the detent 55. In this position, the arms 44 and 46 assert a compressive pressure against the pintles and convex segment 54 presses against pintle camming surface 67 urging the cover in a counterclockwise position as shown in FIG. 4 holding it securely closed. As the cover is rotated in an opening direction as indicated by arrow C in FIG. 5, apex 69 rides over convex surface 54 spreading the resilient arms 44 and 46 until the tip passes the peak portion of the convex segment 54 and then rides downwardly into the detent 53 slightly beyond the position shown in FIG. 5. In this position, the convex curved segment 54 presses against wall 68 of the pintles holding the cover securely in an open position which is approximately 120 degrees rotated clockwise from the closed position. By providing the camming portion 54, the cover will move from a fully closed to a fully opened position without sticking in a mid position. Also by providing this convexly curved surface together with detents 53 and 55, the cover is securely held in the open or closed position.

The hinge means employed with the covered visor assembly of the present invention naturally can be used for a variety of applications where one object is desired to be pivotally coupled to another. The configuration of the socket with the opening slot facilitates the installation of the cover in the preferred embodiment although other arrangements not employing a longitudinal slot could also be employed so long as the socket provides a biasing pressure against which camming means on the pintles cooperate with camming means on the socket for urging the member between first and second predetermined positions spaced from one another. Also, as long as at least one of the pintles or sockets are resilient, the desired biasing pressure can be established between these elements as they move relative to one another.

It will become apparent to those skilled in the art that these and other modifications to the preferred embodiment of the present invention described and disclosed herein can be made without departing from the spirit or scope thereof as defined by the appended claims.

The embodiments of the invention in which an exclusive property or privilege is claimed are defined as follows:

1. A body and cover member including hinge means pivotally attaching the cover to the body, said hinge means comprising:

elongated socket means on one of said body or cover for receiving a pintle, said socket means including a longitudinally extending arcuate interior surface extending around a substantial portion of the interior of said socket, said socket further including a camming surface angularly spaced from said arcuate surface within said socket and detent means formed at the junction of said camming surface and said arcuate surface; and pintle means on the other of said body or cover for fitting in said socket, said pintle means including a curvilinear surface mating with the arcuate surface of said socket and a camming surface angularly spaced from said curvilinear surface and cooperating with said camming surface and detent means of said socket as said cover is rotated about the axis of said pintle for urging said cover to a predetermined position in which said camming surface of said pintle engages said detent means for holding said cover in said predetermined position.

2. The apparatus as defined in claim 1 wherein said camming surface of said socket is a convexly curved segment of said second arm.

3. The apparatus as defined in claim 2 wherein at least one of said socket or pintle is made of a resilient material such that said socket exerts a bias pressure against said pintle.

4. The apparatus as defined in claim 3 and further including a second detent means formed on the interior of the socket on a side of said camming surface opposite said arcuate surface wherein said cover can be rotated to a second predetermined position with respect to said body in which said camming surface of said pintle engages said second detent means.

5. The apparatus as defined in claim 4 wherein said first predetermined position corresponds to a cover open position and said second predetermined position corresponds to a cover closed position.

6. The apparatus as defined in claim 5 wherein said socket includes first and second arms joined at one end and curved toward one another with the opposite ends of said arms spaced in opposing relationship to one another to define a longitudinal slot into which said pintle is lockably inserted.

7. The apparatus as defined in claim 6 wherein the inner surface of said first arm defines said arcuate surface and the inner surface of said second arm defines said camming surface and said first and second detent means.

8. The apparatus as defined in claim 7 wherein said curvilinear surface of said pintle comprises a pair of flat surfaces diverging from a rounded apex and communicating with said curvilinear surface at the ends opposite said apex.

9. A visor mirror assembly comprising:

a mirror frame including a pair of spaced apart generally cylindrical sockets integrally including camming means for receiving hinge pins;

a mirror secured to said frame; and cover means having spaced apart hinge pins fitting within said socket, said hinge pins including camming means cooperating with said camming means of said sockets for urging said cover means between a held-closed position in which said cover means covers said mirror and a held-open position in which said mirror is exposed for use.

10. The assembly as defined in claim 9 wherein said sockets each include a longitudinally extending slot defining an opening smaller than said hinge pins and said sockets are made of a resilient material for permitting said hinge pins to snap into said sockets through said slots.

11. The assembly as defined in claim 10 wherein said camming means of said sockets include a pair of angularly spaced detents formed in the interior of said cylindrical sockets and cooperating with said camming means of said cover means for holding said cover means in an open or a closed position.

12. The assembly as defined in claim 11 wherein said camming means of said sockets further include a convexly curved surface extending between said spaced detents.

13. The assembly as defined in claim 12 wherein said camming means of said hinge pins includes a pair of generally flat surfaces converging to a rounded longitudinally extending apex at one end and a longitudinally extending curved surface at the opposite end whereby said apex cooperates with said detents of said sockets for holding said cover means in an open or closed position and wherein said flat surfaces cooperate with said convex surface for urging said cover between said open or closed position.

14. The assembly as defined in claim 13 wherein each socket includes a pair of inclined surfaces on opposite sides of said slot, which inclined surfaces engage said hinge pins to open said sockets to facilitate installation of said cover to said frame.

15. The assembly as defined in claim 14 and further including light means positioned adjacent said mirror and circuit means for actuating said light means when said cover means is moved to an open position.

16. A visor mirror assembly including a mirror frame and cover including hinge means pivotally attaching the cover to the frame, said hinge means comprising:

elongated socket means on one of said frame or cover for receiving a pintle, said socket means including a longitudinally extending arcuate interior surface extending around a substantial portion of the interior of said socket, said socket further including a camming surface angularly spaced from said arcuate surface within said socket and detent means formed at the junction of said camming surface and said arcuate surface; and pintle means on the other of said frame or cover for fitting in said socket, said pintle means including a curvilinear surface mating with the arcuate surface of said socket and a camming surface angularly spaced from said curvilinear surface and cooperating with said camming surface and detent means of said socket as said cover is rotated about the axis of said pintle for urging said cover to a predetermined position in which said camming surface of said pintle engages said detent means for holding said cover in said predetermined position.

17. The apparatus as defined in claim 16 wherein said camming surface of said socket is a convexly curved segment of said second arm.

18. The apparatus as defined in claim 17 wherein at least one of said socket or pintle is made of a resilient material such that said socket exerts a bias pressure against said pintle.

19. The apparatus as defined in claim 18 and further including a second detent means formed on the interior of the socket on a side of said camming surface opposite said arcuate surface wherein said cover can be rotated to a second predetermined position with respect to said frame in which said camming surface of said pintle engages said second detent means.

20. The apparatus as defined in claim 19 wherein said first predetermined position corresponds to a cover open position and said second predetermined position corresponds to a cover closed position.

21. The apparatus as defined in claim 20 wherein said socket includes first and second arms joined at one end and curved toward one another with the opposite ends of said arms spaced in opposing relationship to one another to define a longitudinal slot into which said pintle is lockably inserted.

22. The apparatus as defined in claim 21 wherein the inner surface of said first arm defines said arcuate surface and the inner surface of said second arm defines said camming surface and said first and second detent means.

23. The apparatus as defined in claim 22 wherein said curvilinear surface of said pintle comprises a pair of flat surfaces diverging from a rounded apex and communicating with said curvilinear surface at the ends opposite said apex.

* * * * *